H. T. GIBBARD.
JACK.
APPLICATION FILED MAR. 24, 1920.

1,379,012.

Patented May 24, 1921.

Inventor
Henry T. Gibbard
By Stuart L. Barnes
Attorney

UNITED STATES PATENT OFFICE.

HENRY T. GIBBARD, OF HIGHLAND PARK, MICHIGAN.

JACK.

1,379,012.  Specification of Letters Patent.  Patented May 24, 1921.

Application filed March 24, 1920. Serial No. 368,229.

*To all whom it may concern:*

Be it known that I, HENRY T. GIBBARD, a citizen of the United States, residing at Highland Park, in the county of Wayne and State of Michigan, have invented certain new and useful Improvements in Jacks, of which the following is a specification.

This invention relates to jacks and has for its object a jack of the double telescoping screw type which is adapted to provide a jack having a greater lifting range for a given height of standard than is the case with a single screw lifting jack. The double telescoping screw type of jack is not broadly new. My improvement consists of an arrangement whereby both screws rise and fall together instead of first one screw rising and then the other screw being caused to rise as has been customary with this type of jack heretofore. There are other features in the way of strength, efficiency and economy in constructing the double telescoping screw type of jack which will be evident after the exact construction is understood.

In the drawings,—

Figures 1, 2, 3, 4, 5, 6:
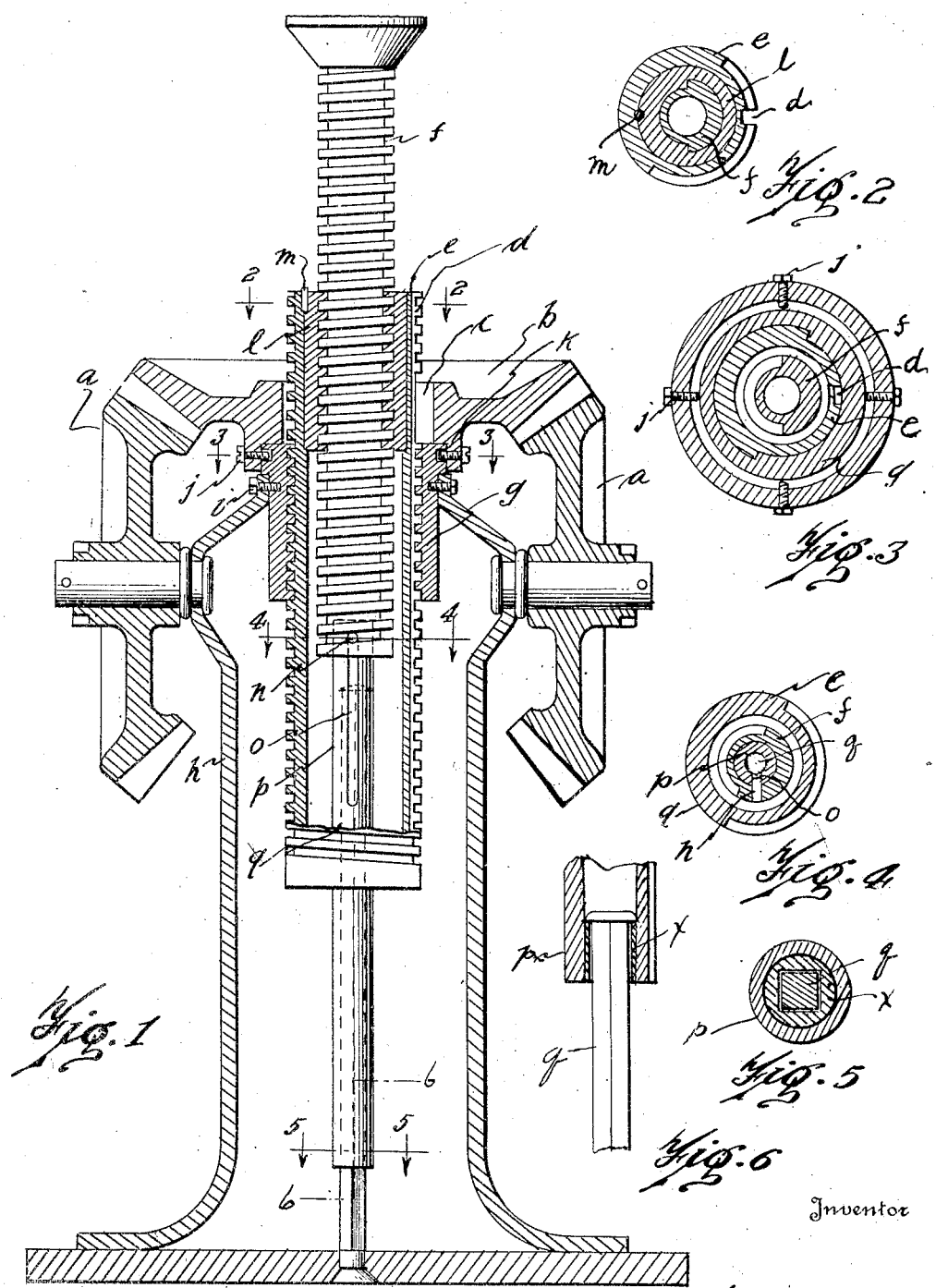
Figure 1 is a vertical or longitudinal section of the jack.
Fig. 2 is a section on the line 2—2 of Fig. 1.
Fig. 3 is a section on the line 3—3 of Fig. 1.
Fig. 4 is a section on the line 4—4 of Fig. 1.

Fig. 5 is a section on the line 5—5 of Fig. 1.

Fig. 6 is a section on the line 6—6 of Fig. 1.

In a co-pending application #361,794 I have described a jack which is provided with a lever that is calculated to actuate the two vertical beveled gears $a$, $a$ in opposite directions, one gear being actuated on the down stroke and the opposite gear on the up stroke, but inasmuch as this is no part of the present improvement I have thought it unnecessary to show the operating lever. Or for that matter, one lever and one gear could be used to operate the horizontal beveled gear $b$ so far as the principle of the invention here to be claimed is concerned. Suffice it to say that there is means provided by which the horizontal beveled gear can be rotated. This horizontal or driven beveled gear $b$ is provided with a key $c$ adapted to engage in the key-way $d$ cut in the side of the outer telescoping screw $e$. This outer telescoping screw is provided with left hand threads. The inner hollow telescoping screw $f$ is provided with right hand threads. The outer telescoping screw threads into a nut $g$ which is held to the standard $h$ by set screws $i$. The set screws $j$ passing through the hub of the driven gear $b$ engage in an annular groove $k$ in the nut $g$ so as to prevent the driven gear $b$ from rising.

Within the outer end of the outer telescoping screw is fitted an interiorly right hand threaded brass bushing or nut $l$. This is a tight fit but in order to insure against rotation the pin $m$ can be driven into a hole which is located partly in the nut and partly in the outer screw so as to tie these two members together. The lower end of the inner screw is provided with a pin $n$ which engages in a slot or key-way $o$ in the sleeve $p$ that slides on the squared spindle $q$ that engages in the squared plug $x$ of the sleeve $p$.

The mode of operation is as follows: Supposing the driven gear $b$ is driven clockwise (considered when looking down upon it), the gear through the key $c$ causes the outer screw to turn clockwise and the threads being left handed the outer screw will rise out of the nut $g$ but the driven gear $b$ will be held from rising by reason of the set screws $j$ engaging in the groove $k$ of the nut $g$. The outer screw in turning will also turn the nut or bushing $l$ in which engage the threads of the inner screw $f$. This nut $l$ will be turned clockwise, causing the inner screw $f$ to simultaneously rise out of the outer screw $d$ because it is held from rotation by reason of the pin $n$ engaging in the slot $o$ of the sleeve $p$ which cannot turn on the squared shaft $q$. It will, therefore, be evident that both screws will simultaneously rise and simultaneously fall. The amount of movement, of course, to every stroke of the lever depends altogether upon the pitch of the threads. If the threads are the same pitch as ordinarily used on a jack, the stem of the jack will rise twice as fast, but, of course, it will be twice as hard to work the lever. This condition can be easily taken care of so as to get the appropriate relation of leverage to movement by varying the pitch of the threads and ratio of gears.

It will be seen that both the threads on the outer screw and the inner screw stop before the bottom of the member that bears the threads is reached. Consequently neither screw can be caused to rise out of the nut. The threads will jam in the extreme lower end and engage in the bottom that starts to run into either nut.

What I claim is:

1. In a jack, the combination of a standard, a nut stationarily supported in the standard, a screw having threads engaging in said nut, means held from traveling up or down for rotating the said screw, a nut rigidly secured in said screw and having threads running in the opposite direction to the threads on the exterior of said screw, a second screw provided with opposite threads engaging in the threads of said rotating nut, and means independent of the load upon the jack for holding said screw against rotation whereby when the said outer screw is rotated both screws will rise and fall together.

2. In a jack, the combination of a standard, a nut stationarily supported in said standard, an outer screw having threads running in one direction and engaging in said nut, means stationary so far as axial movement for rotating the screw and causing the same to rise and fall, a nut supported in the outer screw to rotate therewith and provided with threads running in the opposite direction to the threads on the exterior of the outer screw, an inner screw provided with similarly directed threads engaging in the threads of the rotating nut, and means independent of the load upon the jack for preventing the rotating of the inner screw but allowing the same to slide upwardly and downwardly.

3. In a jack, the combination of a standard, a nut non-rotatably held in said standard, a screw provided with threads engaging in said nut, means stationary so far as axial movement for turning the screw to cause the screw to rise and fall in the nut, a second nut rigidly secured inside of the first-mentioned screw and having threads oppositely directed to the threads on the exterior of the screw, a second screw engaging in said nut, a member having an irregular cross section engaging slidably but non-rotatably within the interior of the said second screw to prevent said screw from turning but allowing it to rise and fall.

4. In a jack, the combination of a standard, a nut stationarily supported in said standard, a screw in said nut, means for rotating said screw, a second nut held rigidly to the inside of said screw and having threads oppositely directed to the threads on the exterior of the hollow screw, a second screw having similarly directed threads engaging in the said nut, a squared spindle rising in the interior of the standard, a sleeve provided with a key-way engaging over said squared spindle and slidable thereon but not rotatable thereupon, and a pin in said second screw engaging in said key-way whereby said second or inner screw may slide vertically in said hollow screw but cannot turn rotatably.

5. In a jack, the combination of a standard, a nut and screw interengaging, one held rigidly by the standard and the other rotating upon this one, means held from rising or falling with respect to the said standard and for rotating the rotating element of said screw and nut, a second nut held so as to rotate with the rotating element of the first-mentioned screw and nut and having threads oppositely directed to the threads of the said first-mentioned screw and nut, a second screw having threads engaging in the last-mentioned nut, and means independent of the load carried upon the jack for preventing the rotation of the second screw.

6. In a jack, the combination of a standard, a nut stationarily supported in said standard, a screw having threads engaging in the threads of the nut, a rotating member held from traveling vertically with respect to the standard and having a sliding key and slot connection with the said screw, a second nut secured on the inside of the said screw to rotate therewith and having threads oppositely directed to the threads on the exterior of the screw, and a second screw having similarly directed threads and engaging in the last-mentioned nut whereby rotation of the rotating member causes both screws to rise and fall together.

7. In a jack, the combination of a standard, a nut stationarily supported in said standard, a screw having threads running in the threads of said nut, a gear for rotating said screw but having a connection with the stationary nut which permits rotation of the gear but prevents the same traveling along its axis, a second nut held within the screw to rotate therewith and having threads oppositely directed to the threads on the exterior of the screw, and a second screw engaging in the said nut whereby rotation of the gear when the second screw is held from rotation serves to cause both screws to rise and fall together.

In testimony whereof I affix my signature.

HENRY T. GIBBARD.